(12) United States Patent
Pechanec et al.

(10) Patent No.: US 8,904,364 B2
(45) Date of Patent: Dec. 2, 2014

(54) EXECUTION IN WORKFLOW BPM ENGINE

(75) Inventors: Jiri Pechanec, Mokra-Horakov (CZ); Martin Vecera, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 500 days.

(21) Appl. No.: 12/876,891

(22) Filed: Sep. 7, 2010

(65) Prior Publication Data
US 2012/0060150 A1 Mar. 8, 2012

(51) Int. Cl.
*G06F 9/35* (2006.01)

(52) U.S. Cl.
USPC ............................ 717/136; 717/106; 717/140

(58) Field of Classification Search
None
See application file for complete search history.

(56) References Cited

U.S. PATENT DOCUMENTS

| | | | |
|---|---|---|---|
| 7,562,339 B2 * | 7/2009 | Racca et al. | 717/102 |
| 8,136,099 B2 * | 3/2012 | Haller et al. | 717/136 |
| 8,196,121 B2 * | 6/2012 | Peshansky et al. | 717/140 |
| 8,782,616 B2 * | 7/2014 | Wright | 717/136 |
| 2003/0236690 A1 * | 12/2003 | Johnston-Watt et al. | 705/7 |
| 2006/0212855 A1 * | 9/2006 | Bournas et al. | 717/140 |
| 2007/0174822 A1 * | 7/2007 | Moser et al. | 717/136 |
| 2007/0266377 A1 * | 11/2007 | Ivanov | 717/136 |
| 2008/0022257 A1 * | 1/2008 | Baartman et al. | 717/106 |
| 2008/0244539 A1 * | 10/2008 | Rajamani et al. | 717/140 |
| 2008/0307392 A1 * | 12/2008 | Racca et al. | 717/120 |
| 2009/0055800 A1 * | 2/2009 | Peshansky et al. | 717/114 |
| 2010/0031232 A1 * | 2/2010 | Glazier et al. | 717/106 |
| 2010/0106546 A1 * | 4/2010 | Sproule | 705/7 |
| 2010/0318960 A1 * | 12/2010 | Bethea et al. | 717/106 |
| 2011/0067013 A1 * | 3/2011 | Frost et al. | 717/148 |

OTHER PUBLICATIONS

"Java Platform, Standard Edition," Wikipedia, Oct. 31, 2007, pp. 1-11, downloaded from the internet, <url>:http://en.wikipedia.org/wiki/J2SE on Dec. 3, 2012.*
"Java Virtual Machine," Wikipedia, Aug. 9, 2009, pp. 1-7, downloaded from the internet, <url>:http://en.wikipedia.org/wiki/Java_Virtual_Machine on Dec. 3, 2012.*
Zhao et al., "Compiling business processes: untangling unstructured loops in irreducible flow graphs," 2006, Int. J. Web and Grid Services, vol. 2, No. 1, pp. 68-91.*
Ouyang et al., "From Business Process Models to Process-Oriented Software Systems," 2009, ACM Transactions on Software Engineering and Methodology (TOSEM), vol. 19 Issue 1, Aug. 2009, Article No. 2, pp. 1-37.*
Farahbod et al., "Specification and Validation of the Business Process Execution Language for Web Services," 2004, Abstract State Machines 2004. Advances in Theory and Practice Lecture Notes in Computer Science, vol. 3052, pp. 78-94.*

* cited by examiner

*Primary Examiner* — Thuy Dao
*Assistant Examiner* — Stephen Berman
(74) *Attorney, Agent, or Firm* — Lowenstein Sandler LLP

(57) ABSTRACT

An apparatus and a method for executing a workflow in a business process management (BPM) engine is described. A business process management (BPM) process definition is generated based on a business process at a BPM generator of a BPM system. The BPM process definition is translated into a Java source code at a translator engine of the BPM system. The Java source code is compiled into a Java byte code at a compiler engine of the BPM engine. The processing device of the BPM system is configured to execute the Java byte code.

15 Claims, 4 Drawing Sheets

EXECUTION IN WORKFLOW BPM ENGINE

TECHNICAL FIELD

Embodiments of the present invention relate to computing systems, and more particularly, to an engine for processing Business Process Management (BPM) workflow.

BACKGROUND

Business Process Management (BPM) is a computer-based automation of an organization's business processes. It is composed of a sequence of activities (work tasks), interactions with human resources (users), or IT resources (software applications and databases), as well as rules controlling the progression of processes through the various stages associated with each activity.

At the various stages of the process, activities may require human interactions: typically user data entry through a form. They may also interact with IT applications or data sources to exchange information in various formats, such as files, e-mails, database content, etc.

One of the ways to automate processes is to develop or purchase an application that executes the required steps of the process; however, in practice, these applications rarely execute all the steps of the process accurately or completely. Another approach is to use a combination of software and human intervention; however this approach is more complex, making the documentation process difficult.

As a response to these problems, software has been developed that enables the full business process (as developed in the process design activity) to be defined in a computer format (e.g. XML). The XML source code is processed by an interpretor for execution by the computer. The system will either use services in connected applications to perform business operations (e.g. calculating a repayment plan for a loan) or, when a step is too complex to automate, will ask for human input. However, interpreting the XML source code requires limited computing resources and takes time. Because the XML source code is interpreted for execution, the execution of the business process is time consuming.

BRIEF DESCRIPTION OF THE DRAWINGS

The present invention is illustrated by way of example, and not by way of limitation, in the figures of the accompanying drawings and in which.

DETAILED DESCRIPTION

Described herein is an apparatus and a method for executing a workflow in a business process management (BPM) engine. A business process management (BPM) process definition is generated based on a business process at a BPM generator of a BPM system. The BPM process definition is translated to a Java source code at a translator engine of the BPM system. The Java source code is compiled into a Java byte code at a compiler engine of the BPM engine. A Java Virtual Machine of the processing device of the BPM system is configured to execute the Java byte code.

Figure 1:
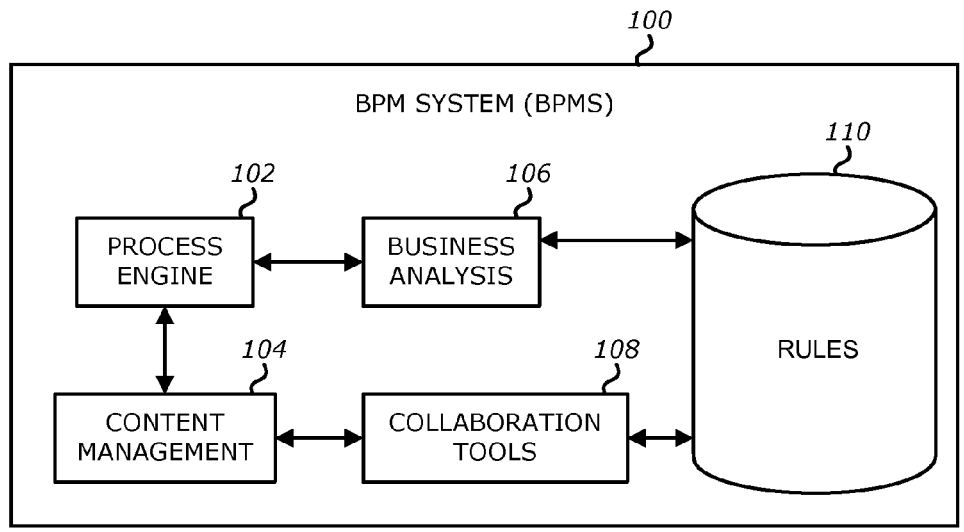
FIG. 1 is a block diagram illustrating one embodiment of a BPM system.

FIG. 1 is a block diagram illustrating one embodiment of a BPM system 100. A Business Process Management (BPM) is the computer-based automation of an organization's business processes. It is composed of a sequence of activities (work tasks), interactions with human resources (users), or IT resources (software applications and data bases), as well as rules controlling the progression of processes through the various stages associated with its activities.

Components of a BPM system 100 (BPMS) comprises: Process Engine 102, Content Management 104, Business Analysis 106, Collaboration Tools 108, and a Database 110.

Process Engine 102 is configured to model and execute process-based applications, including business rules, stored in database 110. Process engine is described in more details with respect to FIG. 2. Content Management 104 provides a system for storing and securing electronic documents, images, and other files in Database 110. Business Analysis 106 enables managers to identify business issues, trends, and opportunities with reports and dashboards and react accordingly. Collaboration Tools 108 removes intra- and interdepartmental communication barriers through discussion forums, dynamic workspaces, and message boards.

Figure 2:
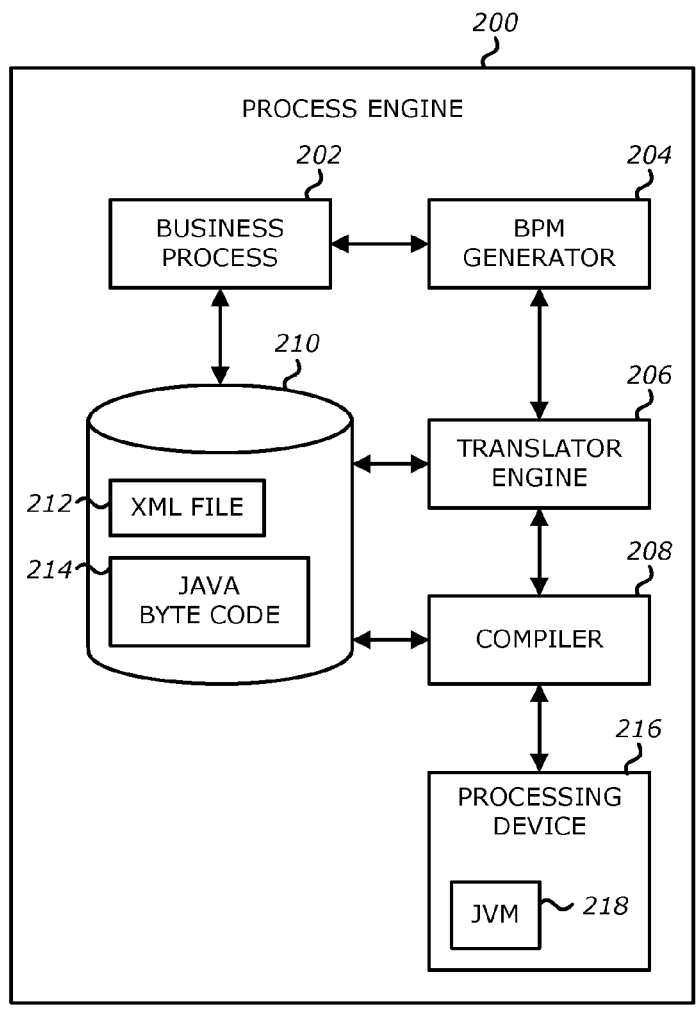
FIG. 2 is a block diagram illustrating one embodiment of a BPM process engine.

FIG. 2 illustrates a BPM Process Engine 200. BPM Process Engine 200 comprises a business process module 202, a BPM generator 204, a translator engine 206, a compiler 208, and a storage device 210. It should be noted that the storage device 210 may be part of BPM Process Engine 200 or may be located outside BPM Process Engine 200.

A BPM system may operates in two phases: a construction phase and an execution phase. The construction phase comprises the analysis, design and definition of a business process and its activities by means of a modeling tool. Interfaces with applications and data sources are also built during this phase. The execution phase is the instantiation of a business process and the orchestration of its activities and interactions by means of an execution engine. Processes are monitored and administered by means of a graphical console during this phase.

In one embodiment, the construction phase is implemented with business process module 202 which includes process design which encompasses both the identification of existing processes and the design of "to-be" processes. Areas of focus include representation of the process flow, the actors within it, alerts and notifications, escalations, Standard Operating Procedures, Service Level Agreements, and task hand-over mechanisms among others.

The proposed improvement could be in human-to-human, human-to-system, and system-to-system workflows, and might target regulatory, market, or competitive challenges faced by the businesses.

Modeling takes the theoretical design and introduces combinations of variables (e.g., changes in rent or materials costs, which determine how the process might operate under different circumstances).

In one embodiment, the execution phase may be implemented with BPM generator 204, translator engine 206, and compiler 208. BPM generator 204 is configured to receive the business process design from business process module 202 and generate a BPM process definition based on the business process design. The business process management (BPM) process definition comprises a graphical representation of the business process. In one embodiment, the BPM process definition includes a XML formatted process definition.

In one embodiment, translator engine 206 is configured to translate the BPM process definition into a Java source code.

In another embodiment, the BPM process definition is directly compiled into Java byte code using third party libraries. Compiler 208 is configured to compile the Java source code into Java byte code. Processing device 216 comprises a Java Virtual Machine 218 (JVM) configured to execute the Java byte code.

As such, instead of interpreting the BPM process definition which would require more time, the BPM process definition is translated directly into byte code which can be efficiently executed and processed on JVM 218.

In one embodiment, a storage device 210, stores a XML formatted process definition 212 generated by BPM generator 204, Java byte code 214 generated by compiler 208.

Process engine 200 can either use services in connected applications to perform business operations (e.g. calculating a repayment plan for a loan) or, when a step is too complex to automate, will ask for human input. Directly executing a process definition can be more straightforward and therefore easier to improve. However, automating a process definition requires flexible and comprehensive infrastructure, which typically rules out implementing these systems in a legacy IT environment.

Business rules (stored in storage device 110) have been used by systems to provide definitions for governing behavior, and a business rule engine (not shown) can be used to drive process execution and resolution.

Processing device 216 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device may also be one or more special-purpose processing devices such as an application specific integrated circuit (ASIC), a field programmable gate array (FPGA), a digital signal processor (DSP), network processor, or the like. Processing device 216 is configured to execute modules 202, 204, 206, 208, and 216 for performing the operations and steps discussed herein with. In one embodiment, modules 202, 204, 206, 208, and 216 may be include hardware or software or a combination of both.

Data storage devices 110 and 210 may include a non-transitory computer-accessible storage medium on which is stored one or more sets of instructions embodying any one or more of the methodologies or functions described herein. The software may also reside, completely or at least partially, within the main memory and/or within the processing device during execution thereof by the computer system, the main memory and the processing device also constituting computer-accessible storage media. The software may further be transmitted or received over a network via the network interface device.

While the computer-accessible storage medium is shown in an exemplary embodiment to be a single medium, the term "computer-accessible storage medium" should be taken to include a single medium or multiple media (e.g., a centralized or distributed database, and/or associated caches and servers) that store the one or more sets of instructions. The term "computer-accessible storage medium" shall also be taken to include any medium that is capable of storing, encoding or carrying a set of instructions for execution by the machine and that cause the machine to perform any one or more of the methodologies of the present invention. The term "computer-accessible storage medium" shall accordingly be taken to include, but not be limited to, solid-state memories, optical and magnetic media.

Figure 3A:
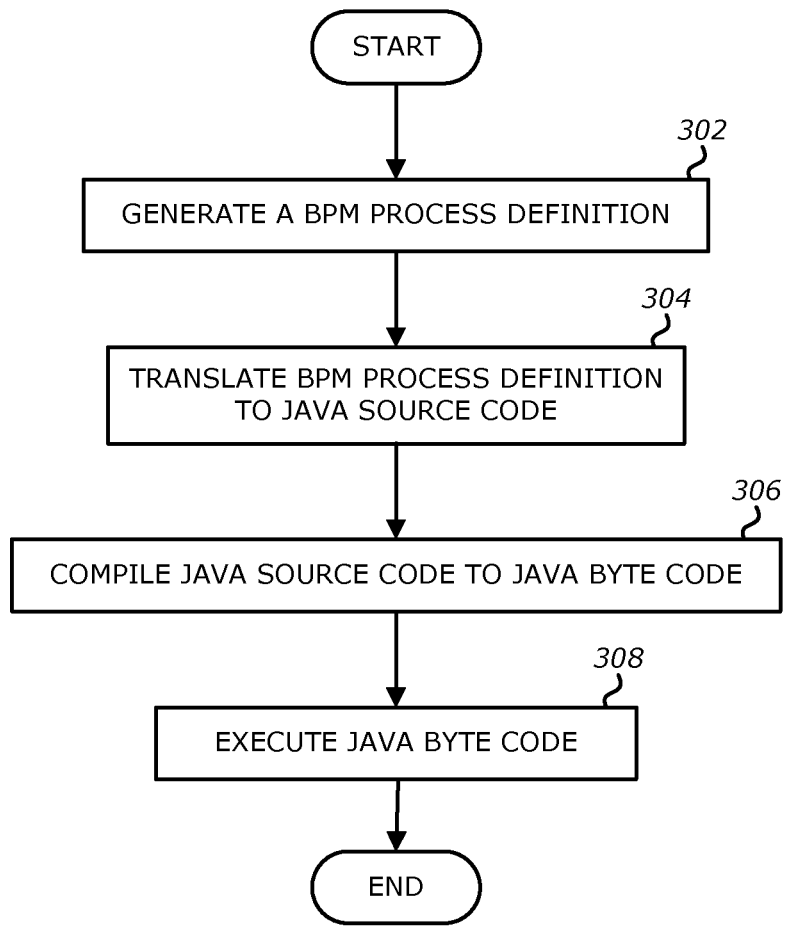
FIG. 3A is a flow diagram illustrating one embodiment of a method for executing a BPM.

FIG. 3A is a flow diagram illustrating one embodiment of a method for executing a BPM. At 302, a business process management (BPM) process definition is generated based on a business process at a BPM generator of a BPM system. At 304, the BPM process definition is translated into Java source code at a translator engine of the BPM system instead of being interpreted. At 306, the Java source code is compiled into a Java byte code at a compiler engine of the BPM engine. At 308, the Java Virtual Machine of a processing device of the BPM system executes the Java byte code.

Figure 3B:
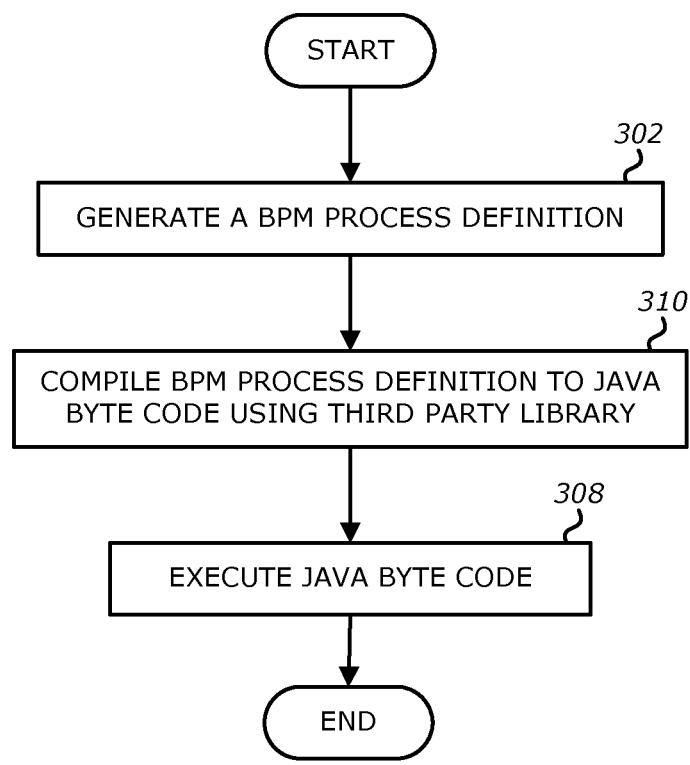
FIG. 3B is a flow diagram illustrating another embodiment of a method for executing a BPM.

FIG. 3B is a flow diagram illustrating one embodiment of a method for executing a BPM. At 302, a business process management (BPM) process definition is generated based on a business process at a BPM generator of a BPM system. At 306, a compiler compiles the BPM process definition directly to Java source code at a compiler engine of the BPM engine using third party libraries. At 308, the Java Virtual Machine of a processing device of the BPM system executes the Java byte code.

Figure 4:
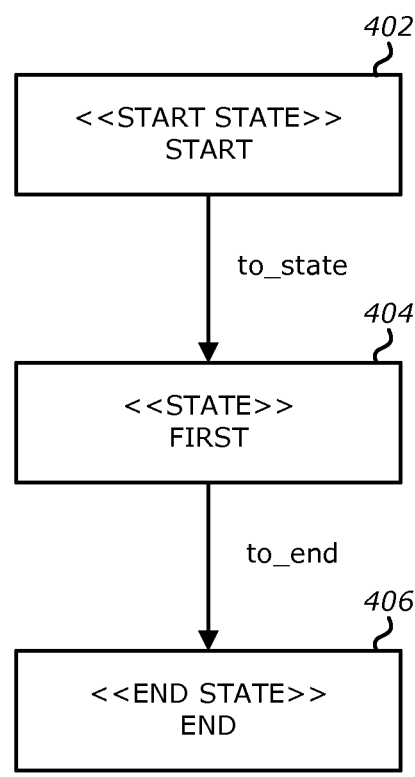
FIG. 4 is an example of a BPM process.

FIG. 4 is a graphical representation of a sample BPM process with a simple assignment task (processdefinition-.xml). At 402, a task is started. At 404, a process state of the task is generated. At 406, the process state ends. The XML representation of FIG. 4 is as follows:

```
<process-definition
    xmlns="urn:jbpm.org:jpdl-3.2"
    name="simple">
        <start-state name="start">
            <transition name="to_state" to="first"></transition>
        </start-state>
        <state name="first">
            <transition name="to_end" to="end">
                <action name="action" expression="account.address = customer.address"></action>
            </transition>
        </state>
        <end-state name="end"></end-state>
</process-definition>
```

This representation is used by a Business Process Management System to execute the process assign.java:

```
// This is a part of the generated code for the sample process
private void assignAction1(Account account, Customer customer) {
    account.address = customer.address;
}
```

The following is a sample method in Java showing how the assignment action can be translated to java assign.bc:

```
aload_0 // 0x2A
aload_1 // 0x2B
getfield org/jboss/soa/esb/bpm/SimpleProcess/Customer/address Ljava/lang/String; // 0xB4 indexbyte1 indexbyte2
putfield org/jboss/soa/esb/bpm/SimpleProcess/Account/address Ljava/lang/String; // 0xB5 indexbyte1 indexbyte2
return // 0xB1
```

This file (assign.bc) shows the actual bytecode source for the previous file.

A compiled bytecode can be generated from the bytecode source assign.bc file.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
   identifying a first process from existing processes of a business process at a business process module of a business process management (BPM) process engine;
   designing a second process of the business process at the business process module;
   generating, by a processing device executing a BPM generator of the BPM process engine, in view of the first process and the second process, a BPM process definition of the business process, the BPM process definition comprising an Extensible Markup Language (XML) formatted process definition file;
   translating the BPM process definition into a source code at a translator engine of the BPM process engine;
   compiling the source code of the BPM process definition into a byte code at a compiler of the BPM process engine; and
   executing the byte code with a virtual machine of the processing device.

2. The computer-implemented method of claim 1 further comprising:
   compiling the BPM process definition into the byte code with a library.

3. The method of claim 1 further comprising:
   executing the byte code with a Java™ Virtual Machine (JVM).

4. The method of claim 1 wherein the BPM process definition comprises a graphical representation of the business process.

5. A non-transitory computer-readable storage medium, having instructions stored thereon, which when executed by a processing device, cause the processing device to perform operations comprising:
   identifying a first process from existing processes of a business process at a business process module of a business process management (BPM) process engine;
   designing a second process of the business process at the business process module;
   generating, by the processing device executing a BPM generator of the BPM process engine, in view of the first process and the second process, a BPM process definition of the business process, the BPM process definition comprising an Extensible Markup Language (XML) formatted process definition file;
   translating the BPM process definition into a source code at a translator engine of the BPM process engine;
   compiling the source code of the BPM process definition into a byte code at a compiler of the BPM process engine; and
   executing the byte code with a virtual machine of the processing device.

6. The non-transitory computer-readable storage medium of claim 5 further having instructions stored thereon, which, when executed by the processing device, cause the processing device to perform operations comprising:
   compiling the BPM process definition into the byte code with a library.

7. The non-transitory computer-readable storage medium of claim 5 further having instructions stored thereon, which, when executed by the processing device, cause the processing device to perform operations comprising:
   executing the byte code with a Java™ Virtual Machine (JVM).

8. The non-transitory computer-readable storage medium of claim 5 wherein the BPM process definition comprises a graphical representation of the business process.

9. A system comprising:
a storage device; and
a processing device, comprising a processor, coupled to the storage device, to:
- identify a first process from existing processes of a business process at a business process module of a business process management (BPM) process engine;
- design a second process of the business process at the business process module;
- generate, in view of the first process and the second process, a BPM process definition of the business process, the BPM process definition comprising an Extensible Markup Language (XML) formatted process definition file;
- translate the BPM process definition into a source code at a translator engine of the BPM process engine;
- compile the source code of the BPM process definition into a byte code at a compiler of the BPM process engine; and
- execute the byte code with a virtual machine of the processing device.

10. The system of claim 9 wherein the processing device is further to compile the BPM process definition into the byte code with a library.

11. The system of claim 9 wherein the processing device is further to execute the byte code with a Java™ Virtual Machine (JVM).

12. The system of claim 9 wherein the BPM definition comprises a graphical representation of the business process.

13. The method of claim 1 wherein the second process is a future process, wherein the source code comprises a Java™ source code and wherein the byte code comprises a Java™ byte code.

14. The non-transitory computer-readable storage medium of claim 5 wherein the second process is a future process, wherein the source code comprises a Java™ source code and wherein the byte code comprises a Java™ byte code.

15. The system of claim 9 wherein the second process is a future process, wherein the source code comprises a Java™ source code and wherein the byte code comprises a Java™ byte code.

* * * * *